May 2, 1950 — C. BOLTSON — 2,506,292
STAIR TRAVELING BABY CARRIAGE
Filed Nov. 1, 1948 — 2 Sheets-Sheet 1
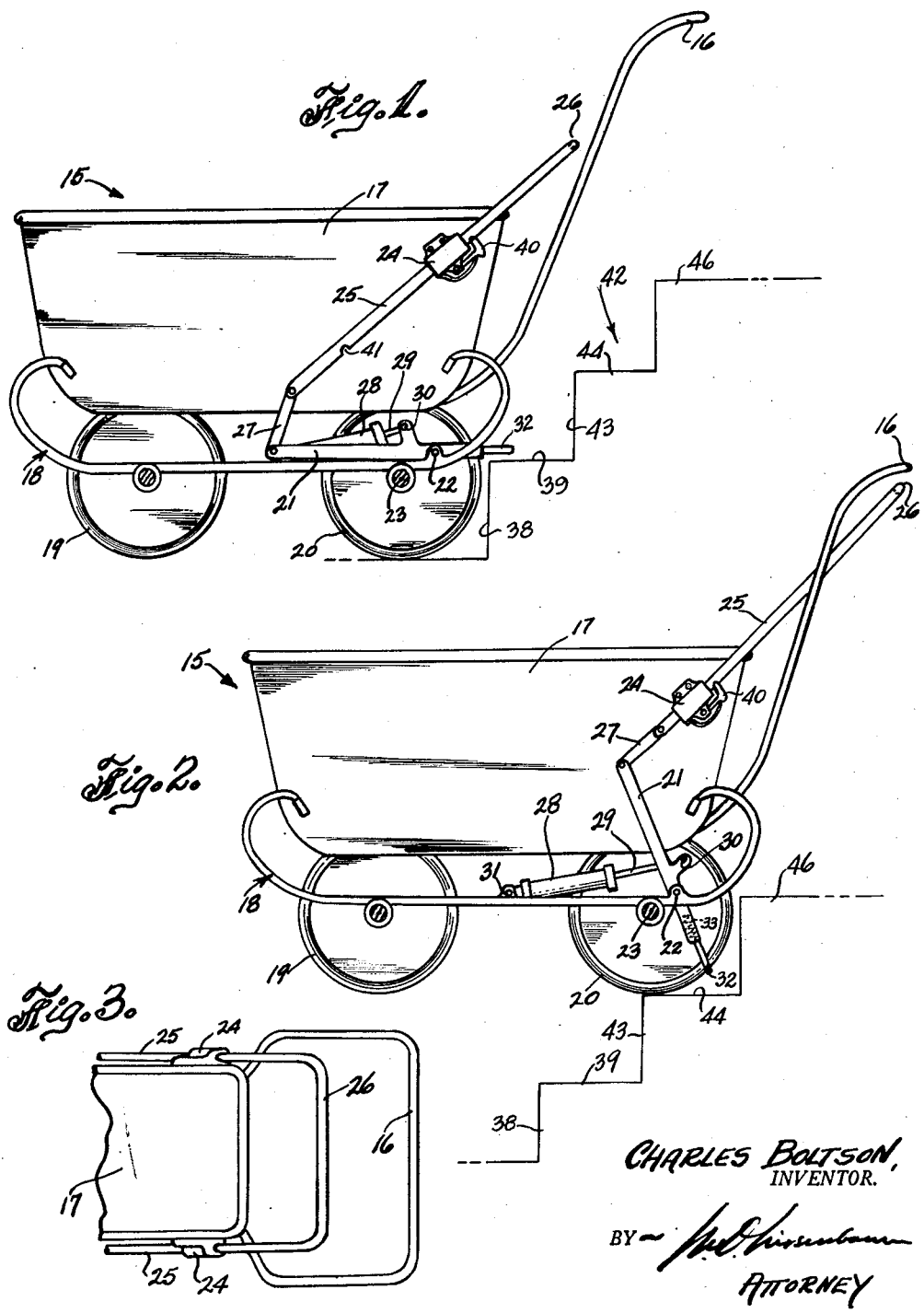

May 2, 1950 C. BOLTSON 2,506,292
STAIR TRAVELING BABY CARRIAGE
Filed Nov. 1, 1948 2 Sheets-Sheet 2
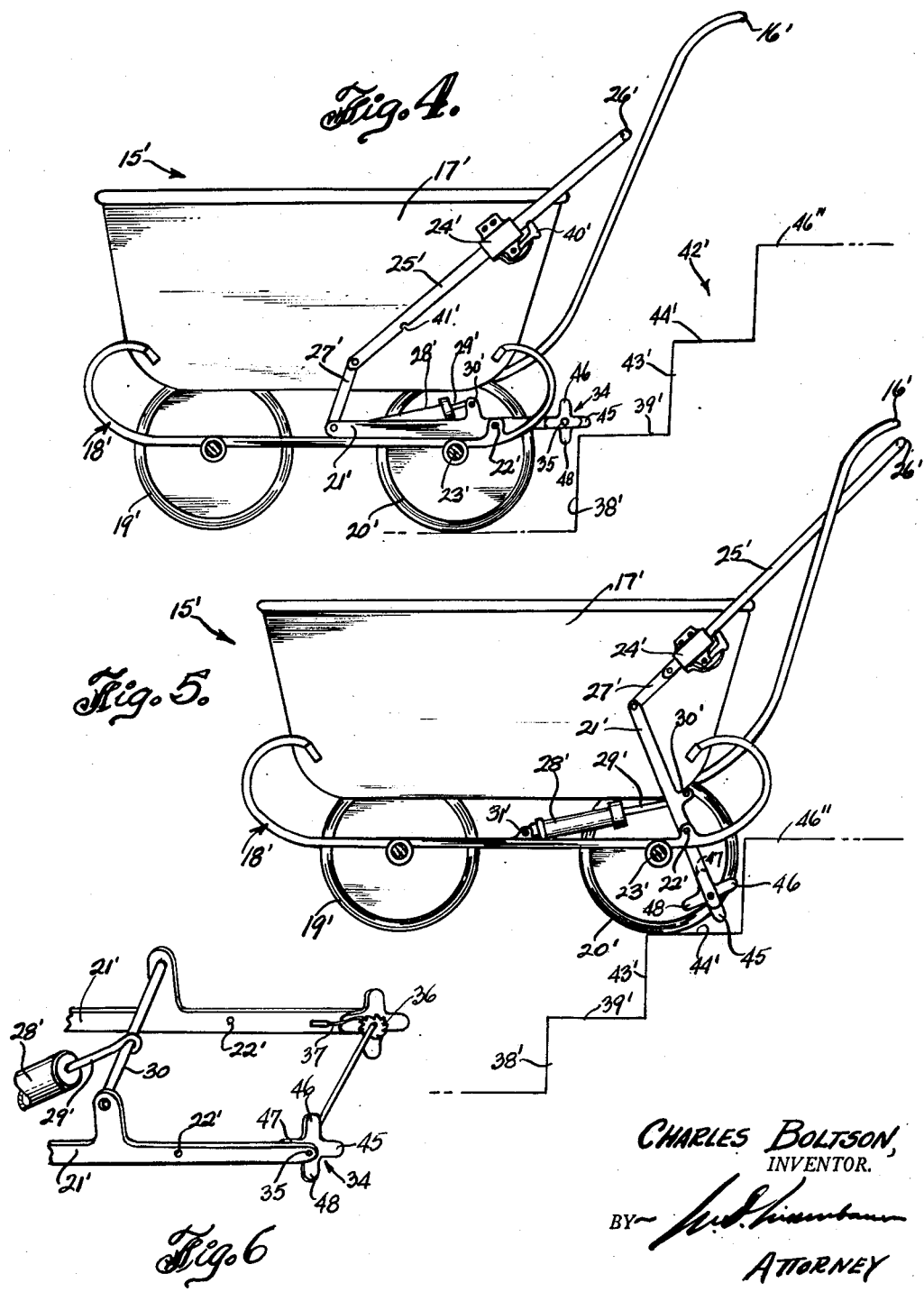

Patented May 2, 1950

2,506,292

UNITED STATES PATENT OFFICE 2,506,292

STAIR TRAVELING BABY CARRIAGE

Charles Boltson, Brooklyn, N. Y., assignor of one-half to David Willett, Brooklyn, N. Y.

Application November 1, 1948, Serial No. 57,687

7 Claims. (Cl. 280—29.)

The present invention relates to baby carriages and the like.

The principal object of this invention is to provide novel and improved means on a baby carriage, to facilitate bringing the carriage up and down stairs.

Another object hereof is to provide a baby carriage with novel and improved means having a new mode of operation to accomplish the stated functions, which is easy to use, reasonably cheap to manufacture built-in or as an attachment, and which is efficient in carrying out the purposes for which it is designed.

Other objects and advantages will become apparent as this disclosure proceeds.

In the accompanying drawings forming part of this specification, similar characters of reference indicate corresponding parts in all the views.

Fig. 1 is a side view of a baby carriage provided with a means of the character mentioned embodying the teachings of this invention. Said means may be called a carriage lifting and lowering device. This view shows the said device in position where the carriage is ready to be brought up a step. The device is in this same position, just as the carriage has been lowered a step.

Fig. 2 is a similar view with said device in position where the carriage is ready to be brought down a step. Said device is in this same position, just as the carriage has been raised a step.

Fig. 3 is a fragmentary top plan view of Fig. 1.

Figs. 4 and 5 are views similar to Figs. 1 and 2, respectively, including however, a modified embodiment of the carriage lifting and lowering device, in accordance with this invention.

Fig. 6 is a fragmentary perspective view of a part of said modified device shown in Figs. 4 and 5.

In the drawings, Figs. 1 and 2, the numeral 15 generally designates a baby carriage having a handle 16 and a body 17, mounted on a framework denoted generally by the numeral 18. The front wheel and the rear wheel nearest the observer, are omitted from the drawings for the sake of clarity of illustration. The other front wheel is 19, and the other rear wheel is designated by the numeral 20; the handle-end of the carriage being termed its rear end.

At at least one side of the carriage, and if desired, at each side thereof, there is a lever 21, pivotally mounted at 22 as a fulcrum therefor on the frame 18. This fulcrum is preferably above and rearwardly of the rear axle 23. The carriage body 17, has mounted thereon, at one or both sides thereof, as construction may require, a bracket 24, through which is slidably mounted a bar 25. Where there are two such bars, as in the embodiment illustrated, they may be part of a U-form, where part 26 may be termed the operating handle. The lower end of bar 25 and the forward end of lever 21, are pivotally connected at the respective ends of a link 27. The dimension of parts are such that when operating handle 26 is in pushed down position as in Fig. 1, the lever 21 is about in horizontal, and when said operating handle 26 is in its upward position as in Fig. 2, the position of lever 21 approaches towards vertical. If desired, an air cylinder 28 may be included as shown, with piston rod 29 pivotally connected at 30, and with the bottom of said cylinder, pivotally connected to the framework 18, at 31. All parts corresponding to the above which are also in Fig. 4, are marked with the same numbers primed.

In Fig. 1, the end of the lever 21 which extends toward the handle-end of the carriage 15, is tubular or otherwise suitable for the telescopically associated slidable lever extension member 32, normally maintained extended by means of a compression spring 33 housed within said tubular end. The length of said lever extension member 32, is such that when substantially horizontal and in extended position, the free end of said extension member shall be rearwardly beyond the vertical plane tangent to the rear wheels of the carriage at handle-end of the carriage, and said length is such that regardless of position of the lever 21, the free end of said extension member 32, is above the ground.

In the modified embodiment shown in Fig. 4, the moveable extension for the lever 21', is provided by the legs of a cross-shaped member 34, pivotally mounted at 35 at the rearward end of the lever 21'. The length of each of the legs 45, 46, 47 and 48 of the cross-shaped member 34, is such that when any of said legs is positioned in alignment with the lever 21' to serve as an extension thereof, the rearwardly extending free end of such cross's leg shall comply with the requirements above mentioned for the extension member 32. The cross member 34 carries or is otherwise adapted to rotate about axis 35, with a ratchet gear wheel 36. Engaging said ratchet's teeth, is a spring pawl 37, extending from the lever 21'. The ratchet wheel 36 is positioned so that the cross-shaped member 34 is permitted only clockwise rotation about axis 35, which means that the particular leg of the cross-shaped member which is positioned as an extension of the lever 21', is permitted downward movement, but not upward movement.

Another requirement as to dimensions, is that when the set up of parts is as shown in Fig. 1, then, when the carriage is brought so that its rear wheels contact the riser 38 leading to a step 39, the extension member 32 shall lie above said step and come in contact with said step when said extension member is moved downwardly upon upward movement of the operating handle 26. The embodiment shown in Fig. 4, has analogous dimensional requirement.

If desired, a spring loaded latch finger 40 may be provided, adapted to engage slide bar 25 in notch 41. These components in Fig. 4, are indicated by corresponding numerals primed.

The manner of operation to bring these carriages up and down steps, will now be explained.

As to either of the embodiments illustrated, the mechanism on the carriage may be in any position shown in the drawings.

Referring to the embodiment shown in Figs. 1 and 2, when the carriage is to be brought up a flight of steps 42, it is backed up with rear wheels 20 against riser 38. If the set up of parts is as shown in Fig. 1, lever extension 32 will be slightly above the step 39. The operating handle 26 is now pulled upwardly along the slant line of the bar or bars 25, whereby lever 21 will be swung in a clockwise direction about its fulcrum 22. The lever's extension member 32 will contact the step 39, and the carriage 15 will be lifted until the said rear wheels 20 ride on the step 39, whereupon the mechanism is in condition as shown in Fig. 2. Now, with said wheels up against the riser 43, the operating handle 26 is pushed downwardly along the line of bar 25, to restore the position of the lever 21 to horizontal as in Fig. 1. When extension member 32 contacts riser 43, it will be pushed into the hollow in lever 21 against action of the spring 33. But as soon as said member 32 clears the riser, it will be pushed out and assume over step 44, the position it held over step 39. This operation is repeated on each step until the carriage has been brought up the flight of stairs. The operator holds onto the carriage handle 16 while he manipulates the operating handle 26. Of course, to gain mechanical advantage, the position of the fulcrum 22 should be nearer the free tip of the extension member 32 in extended position, than said fulcrum is from the end of the lever at link 27. If the carriage with mechanism in condition as shown in Fig. 2, approaches the first riser 38, it is obvious that upon pushing operating handle 26 slantingly downward, the mechanism will be brought to the condition illustrated in Fig. 1, ready for manipulation to lift the carriage onto step 39.

To bring the carriage 15 downstairs, the mechanism is set up as shown in Fig. 2, where the operating handle 26 is in its upward position. Holding carriage handle 16 in one hand, and with the other hand holding the operating handle 26, the carriage is pushed forward by pushing its handle 16, until the wheels 19 leave the step 46 whereupon the tip end of the lever's extension member 32 contact the step 46. The operator holding back the automatic downward movement of the operating handle 26, will thereby control the lowering of the carriage 15 onto the next step 44. The carriage by its handle 16 is then pushed forward on step 44 and the operating handle 26 is raised to restore the condition of the mechanism as shown in Fig. 2. Now the operation is repeated on each step downwardly.

Each time the mechanism is manipulated from the condition of Fig. 2 to that shown in Fig. 1, if an air cylinder 28 is included, there will be a retarding of counter-clockwise movement of the lever 21. Such retarding should be regulated to be of such worth, that although it shall aid in the lowering of the carriage down the steps, it shall not unduly hamper lifting the carriage up the steps.

Referring to the embodiment shown in Figs. 4 and 5, when the carriage 15' is to be brought up a flight of stairs 42', it is backed up with its rear wheels 20' against the riser 38'. If the set-up is in the condition shown in Fig. 4, the extension of lever 21', which here is the leg 45 of the cross-shaped member 34, will lie above the step 39', substantially horizontally. The operating handle 26' is now pulled upwardly along the slant line of the bar or bars 25', whereby lever 21' will be swung in a clockwise direction about its fulcrum 22'. The lever's extension member, meaning said leg 45, will contact the step 39' and the carriage 15' will be lifted until the said rear wheels 20' ride on the step 39', whereupon the mechanism is in the condition shown in Fig. 5. It is to be noted that the cross-member 34 is maintained against counter-clockwise rotation due to action of pawl 37 engaging the teeth of the ratchet 36.

Before the rear wheels 20' reach the riser 43', the operating handle 26' is pushed downwardly to raise the cross-member 34 so that the tip of its leg 46 shall contact said riser 43', and upon continued downward movement of the operating handle 26', the cross member 34 will be rotated clockwise, due to the frictional contact of the tip of said leg 46 with the riser 43'; such rotation being permitted by the ratchet and pawl. Leg 47 will now be horizontally above the step 44', a position akin to that shown in Fig. 4. This operation is repeated on each step until the carriage 15' has been brought up the flight of steps. If the carriage 15' with mechanism in the condition shown in Fig. 5, approaches the first riser 38', the required manipulation to bring the mechanism to the condition shown in Fig. 4, is obvious.

To bring the carriage 15' downstairs, the mechanism is set as in Fig. 5. No counter-clockwise movement of the cross-shaped member 34 being permitted by action of the pawl 37, the leg 45 serves as a rigid extension of the lever 21', and the mode of operation is the same as is given herein for the embodiment shown in Fig. 1.

If desired, the handle 16 may be omitted, and the carriage may be pushed for normal riding on a road when latch 40 is set to engage the notch 41. Release of said latch engagement, permits operation of the mechanism if for slanting downward movement of the operating handle 26, the operator applies force downwardly along a line more upright than the slant of the bar 25. Such directed force resolves itself into a vertical component to balance the carriage and a slanting component along the line of the bar 25, to push said bar downwardly.

This invention is capable of numerous forms and various applications without departing from the essential features herein disclosed. It is therefore intended and desired that the embodiments herein shall be deemed illustrative and not restrictive and that the patent shall cover all patentable novelty herein set forth; reference being had to the following claims rather than to the specific description herein to indicate the scope of this invention.

I claim:

1. In a manually-operated, stair-travelling vehicle, having rear wheels carried rotatably on a frame, the combination of a lever pivotally mounted intermediate its ends on the frame; the axis of swing of said lever and the axis of rotation of said wheels being substantially parallel; said lever having a portion thereof extending towards the rear of the vehicle, a member moveably mounted on said lever portion and extending as a rearward extension of said lever portion; said member being above the plane of a stair when positioned substantially horizontal upon movement of the lever about its pivotal connection and means maintaining said member in fixed angular relation with said rearwardly extending lever portion while said lever portion is swung downwardly; the dimension of said member and the position of the pivotal connection of the lever being such that said member in normal rest position on the lever, extends rearwardly of the rear wheels when said member is substantially horizontal and downwardly beyond said wheels and above the ground when the rearward portion of said lever is positioned tilted downwardly rearwardly.

2. The combination as defined in claim 1, wherein the member on the rearward portion of the lever is of elongated form mounted for longitudinal sliding movement on said lever portion as an extension of said lever portion and resilient means carried on the lever acting to maintain said member in part rearwardly of said lever.

3. The combination as defined in claim 1, wherein the member on the rearward portion of the lever is the leg of a cross-shaped component; said cross-shaped component being pivotally mounted at the junction of its legs on the rear end of said lever; the axis of the pivotal connection of said component on the lever, being substantially parallel to the axis of rotation of the wheels.

4. The combination as defined in claim 1, including a bar moveably mounted on the vehicle and accessible at the rear of the vehicle and means connecting said bar and lever whereby the lever will be swung about its pivotal connection when the bar is manually moved on the vehicle.

5. The combination as defined in claim 1, wherein the lever includes a portion extending toward the front of the vehicle from the pivotal connection of the lever, and including a bar slidably mounted along the vehicle and a link connecting the forward ends of the lever and said bar whereby the lever will be swung about its pivotal connection when the bar is manually moved on the vehicle.

6. The combination as defined in claim 1, including means carried on the vehicle, acting to retard swinging movement of the lever during upward movement of the rearward portion of the lever.

7. The combination as defined in claim 1, including means carried on the vehicle to limit the extent of downward movement of the rearward portion of the lever.

CHARLES BOLTSON.

REFERENCES CITED

The following references are of record in the file of this patent:

UNITED STATES PATENTS

| Number | Name | Date |
| --- | --- | --- |
| 1,551,127 | Whyel | Aug. 25, 1925 |
| 1,654,188 | Phillips | Dec. 27, 1927 |
| 1,660,517 | Milliken | Feb. 28, 1928 |
| 1,885,112 | Jankisz | Nov. 1, 1932 |
| 1,959,810 | Bodge | May 22, 1934 |
| 2,418,665 | Rizzuto | Apr. 8, 1947 |